E. G. CHASE.
GLASS BLOWING MACHINE.
APPLICATION FILED MAY 13, 1915.
1,162,337.
Patented Nov. 30, 1915.
2 SHEETS—SHEET 2.
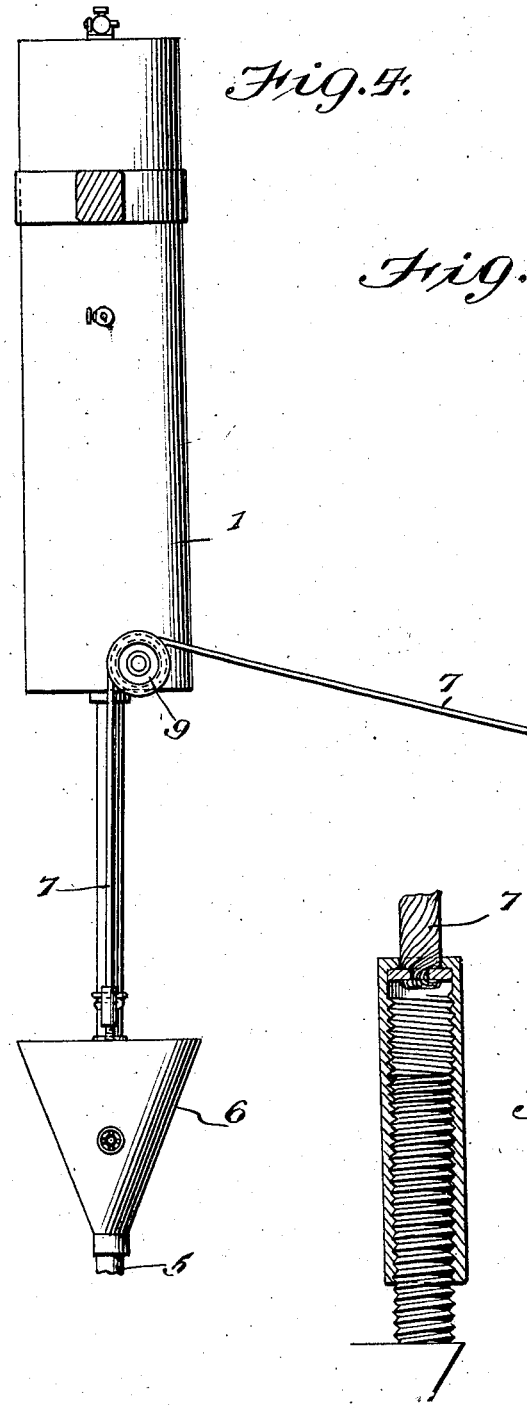
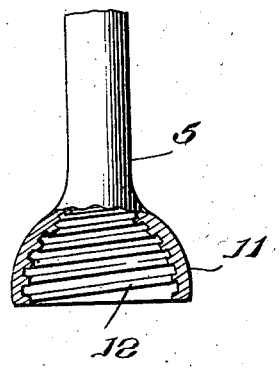
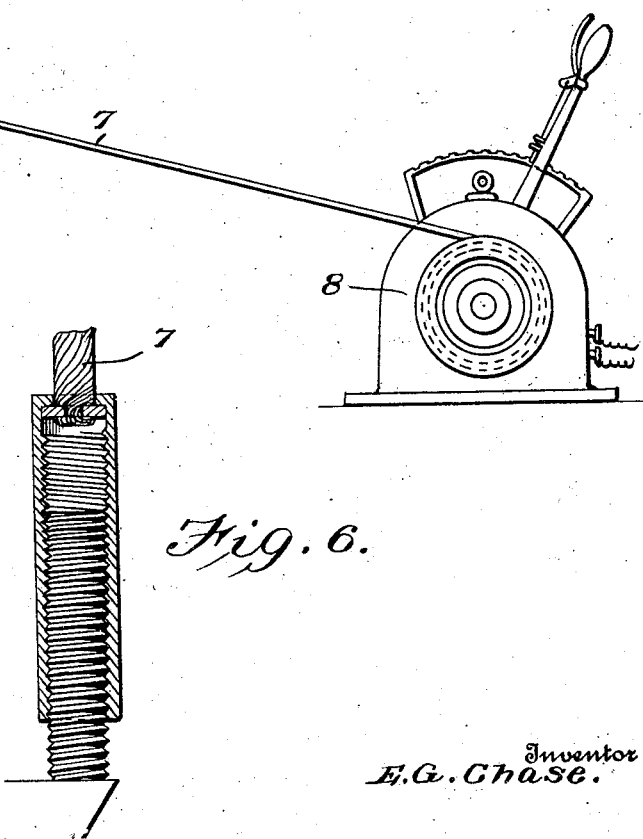
Inventor
E. G. Chase.
By
Attorneys

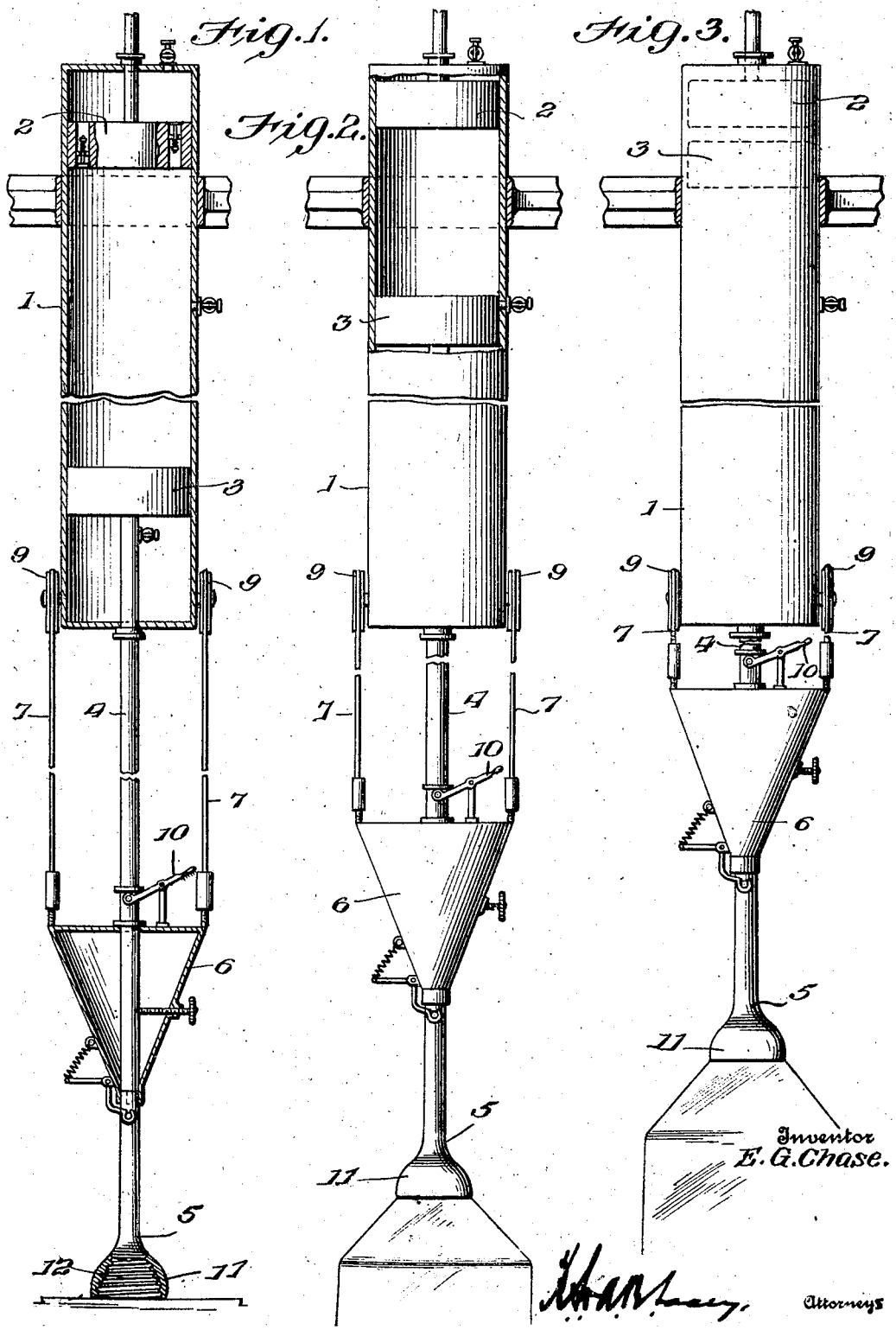

UNITED STATES PATENT OFFICE.

EARL G. CHASE, OF SMETHPORT, PENNSYLVANIA, ASSIGNOR OF FORTY-FIVE ONE-HUNDREDTHS TO GEORGE W. HOWARD, OF SMETHPORT, PENNSYLVANIA.

GLASS-BLOWING MACHINE.

1,162,337.   Specification of Letters Patent.   Patented Nov. 30, 1915.

Application filed May 13, 1915. Serial No. 27,865.

*To all whom it may concern:*

Be it known that I, EARL G. CHASE, a citizen of the United States, residing at Smethport, in the county of McKean and State of Pennsylvania, have invented certain new and useful Improvements in Glass-Blowing Machines, of which the following is a specification.

This invention has relation to glass blowing machinery which is practically automatic in operation, the purpose being to devise easily operable means to facilitate the work of forming glass cylinders.

With these and other objects in view, which will readily appear as the nature of the invention is better understood, the same consists in the improved construction and novel arrangement and combination of parts which will be hereinafter fully described and particularly claimed.

In the accompanying drawings has been illustrated a simple and preferred form of the invention, it being, however, understood that no limitation is necessarily made to the precise structural details therein exhibited, but that changes, alterations and modifications within the scope of the invention as claimed may be resorted to when desired.

Referring to the drawings, Figure 1 is a view in elevation partly in section of a glass blowing machine embodying the invention; Figs. 2 and 3 are views similar to Fig. 1 showing different stages of movement of the blow pipe; Fig. 4 is a side view; Fig. 5 is a sectional view of the glass attaching end of the blow pipe or bait; Fig. 6 is a detail view showing the adjustable connection between the cable and movable part of the machine.

Corresponding and like parts are referred to in the following description and indicated in all the views of the drawings by the same reference characters.

The machine embodies a cylinder 1 which may be supported in any manner. Within the cylinder are located two plungers 2 and 3, each being movable. A tube 4 connects with the plunger 3 and extends therethrough so as to receive the air from the upper portion of the cylinder when the plunger moves upward therein. A bait or blow pipe 5 is attached to the lower end of the tube 4 in such a manner as to be replaced by other baits as required in the operation of the machine. A cage 6 is attached to the lower portion of the tube 4 and is connected by means of cables 7 to a suitable motor 8 by means of which the tube 4 and adjunctive parts are raised or lowered. The cables 7 have adjustable connection with the cage 6 and pass over guide pulleys 9 at opposite sides of the cylinder 1. In order to facilitate the detachment and the replacement of the blow pipe or bait 5 a lever 10 is provided and mounted upon the cage 6. The plunger 2 is adapted to be operated in any manner and provided with suitable valves for controlling the supply of air.

The blow pipe or bait 5 is enlarged at its lower end, as indicated at 11 and is formed upon its inner wall with a spiral bead or thread 12 which is adapted to make positive engagement with the glass when the lower end of the bait is immersed in the molten glass preliminary to blowing the cylinder. In the operation of the machine the bait is lowered into the molten glass contained in a crucible, pot or other container and after the glass has become attached to the blow pipe, the latter is elevated and simultaneously with the upward movement of the blow pipe the plunger 3 is forced upward into the cylinder 1 and the air confined in the cylinder above the plunger 3 is caused to pass downward through the tube 4 and into the glass attached to the blow pipe, thereby expanding the same so as to form a cylinder. At the same time, the plunger 2 is lowered, preferably by a gradually accelerated movement, to increase the air pressure by means of which the cylinder of glass is expanded simultaneously with its elongation. The resistance to the expansion of the cylinder of glass increases proportionately to the cooling of the glass and the lengthening and expansion of the cylinder; hence, the necessity of supplying air in proper proportion to meet such conditions and this is effected by the relative movements of the two plungers 2 and 3 in the manner stated.

Having thus described the invention, what is claimed as new is:—

1. In a glass blowing machine, a vertically disposed cylinder, a movable plunger arranged within the upper portion of the cylinder, a second plunger disposed in the lower portion of the cylinder, a blow pipe having connection with the second plunger and adapted to receive a supply of air from the cylinder by movement of the plungers therein, and means for imparting independent movement to the said plungers.

2. A glass blowing machine comprising a cylinder, two plungers arranged to operate within the cylinder and a blow pipe or bait connected with one of such plungers and adapted to receive air from the cylinder by movement of either one or both of the plungers.

In testimony whereof I affix my signature in presence of two witnesses.

EARL G. CHASE. [L. S.]

Witnesses:
FRANK A. DENNING,
WILLIAM M. DIGEL.